United States Patent
Lal et al.

(10) Patent No.: US 7,089,594 B2
(45) Date of Patent: Aug. 8, 2006

(54) APPLICATION RIGHTS MANAGEMENT IN A MOBILE ENVIRONMENT

(75) Inventors: Vishal Lal, Uttar Pradesh (IN); Umesh Singhal, Karnataka (IN); Jyothirmoy Chakravorthy, Karnataka (IN); Rajesh T S Reddy, Karnataka (IN)

(73) Assignee: July Systems, Inc., Santa Clara, CA (US)

( * ) Notice: Subject to any disclaimer, the term of this patent is extended or adjusted under 35 U.S.C. 154(b) by 154 days.

(21) Appl. No.: 10/623,932

(22) Filed: Jul. 21, 2003

(65) Prior Publication Data

US 2005/0021995 A1 Jan. 27, 2005

(51) Int. Cl.
*H04L 9/00* (2006.01)

(52) U.S. Cl. .................... 726/31; 726/26; 726/30; 713/167; 705/59

(58) Field of Classification Search ............. 726/31; 713/200; 380/247
See application file for complete search history.

(56) References Cited

U.S. PATENT DOCUMENTS 7,013,290 B1* 3/2006 Ananian .................... 705/27

| 2001/0052077 | A1 | 12/2001 | Fung | |
|---|---|---|---|---|
| 2003/0028451 | A1* | 2/2003 | Ananian | 705/27 |
| 2003/0105835 | A1* | 6/2003 | Hori | |
| 2004/0249768 | A1* | 12/2004 | Konito | |

FOREIGN PATENT DOCUMENTS

WO WO 03/003173 A1 1/2003

* cited by examiner

*Primary Examiner*—Kambiz Zand
(74) *Attorney, Agent, or Firm*—William L. Botjer

(57) ABSTRACT

The present invention provides a technique for implementing digital rights management for digital content that can be used on Java enabled mobile devices. It enables the controlled usage of the digital content on the mobile device after it is downloaded from a content provider. This is achieved by a mobile service provider that generates a license based on a rights workflow and applies charging policies to prevent the downloaded digital content from being forwarded to other users. The digital content cannot be used without the license. The digital content can be delivered to the user either through combined or separate delivery, depending on whether the license is sent along with the digital content or not. On expiry of the license, the user is prompted for updating the license. The user can then use the digital content once the license is updated.

23 Claims, 12 Drawing Sheets

APPLICATION RIGHTS MANAGEMENT IN A MOBILE ENVIRONMENT

BACKGROUND

The present invention, in general, relates to distribution and usage of digital content over mobile devices. In particular, this invention relates to distribution and management of Java based digital content (applications) that have digital rights ascribed to them.

With rapid developments in wireless technologies and with the onset of technically superior mobile devices and networks, distribution of digital content, which was predominantly being carried out only on the Internet, is now significantly being done over mobile networks as well. The new-generation mobile devices include mobile phones, Personal Digital Assistant (PDA), Laptops, etc with digital applications such as calendar, games, and the like. The new-generation mobile networks have a high data-transfer rate and, at the same time, support a greater number of mobile users. Thus, developments in mobile network technologies and superior mobile devices have enabled the transfer of digital content over wireless networks.

Broadly speaking, the transfer of digital content over the mobile networks is done in the following manner. Initially, a user requests for download of digital content from his/her mobile service provider. A content provider, which is in contact with a mobile service provider, hosts the downloadable digital content. The user then downloads the requested digital content on his/her mobile device through the mobile service provider. However, as the present mobile devices have the capability to distribute (or forward) the digital content to other mobile devices, a mobile device user can potentially distribute the downloaded digital content to numerous other mobile device users. This means that digital content such as games, graphics, utilities (such as a currency converter) and the like can be forwarded to other users if there is no protection for preventing such distribution. Such uncontrolled distribution is not desirable to the content provider (of the "unprotected" digital content). In order to explain this point more clearly, consider an example of a mobile service provider who provides mobile games for some payments by the user. If the game is "unprotected", then the same may be forwarded and used by numerous other mobile users who have devices capable of receiving and using the game. This is economically undesirable for the content providers. Further, such distribution also leads to problems of licensing and copyright violations. Indeed, the content providers are wary of such problems and these problems are deterring content providers from hosting "rich" digital content for mobile devices without taking necessary steps towards protecting the digital content. It is desirable that the digital content provided by the content provider be protected from such misuse. That is, it is desirable that every mobile user using the digital content pays the content provider in some way to compensate the content provider. In order to address the problem of uncontrolled distribution of digital content, content providers rely on Mobile Digital Rights Management (Mobile DRM) techniques that protect digital content, and allow only authorized usage of the digital content.

Mobile DRM provides a secure infrastructure for the preparation, transmission, and prevention of misuse of the protected digital content. Thus content providers before making digital content available for usage protect the digital content with DRM Packages. A mobile user now cannot indiscriminately transfer this "protected" digital content to other mobile users without the requisite payments being made by the other users as well.

With the implementation of Mobile DRM, the existing state of technology for mobile networks works as follows: a user requests for download of digital content from his/her mobile service provider. Upon receiving the request, the user is prompted to pay for the digital content that he/she intends to download. After receiving the necessary payments, the mobile service provider forwards the digital content (which may have digital rights associated with it) to the user. The user is then able to download the requested digital content on his/her mobile device. The associated digital rights prevent the unauthorized distribution and usage of the downloaded digital content from mobile devices.

The basic requirements of a Mobile DRM system are scalability, provision of security to digital content and ease of implementation. To meet the scalability requirement, the Mobile DRM system should be able to handle diverse types of rights that may be issued by different issuers (for instance different content providers).

For the requirement for provision of security to digital content, the Mobile DRM system must prevent illegal use (such as unauthorized copying, alteration, and distribution) of the digital content. The system should also ensure that the digital content is used according to the rights assigned to it by the content provider.

In the above setup, it is usually the prerogative of the content provider to assign rights to the digital contents and prevent possible misuse while determining a pricing structure for the digital content at the same time. Assigning all the rights to the digital content at the content provider's end may lead to inflexibility in terms of the way the digital content is used in the future. For example, the content provider may fix the pricing of a song and the number of times it can be played without payment. Once this is fixed, the mobile service provider, who distributes this digital content, may not be able to change the above attributes for different user requirements. Further, the content provider may not want the digital content to be copied from one user to another. This may prevent the further distribution of digital content in an authorized manner from one user to another (called superdistribution) and eventually will limit the number of users of the digital content.

For meeting the ease of implementation requirement, the Mobile DRM should require minimal installation of software on the user's mobile device for the implementation of Mobile DRM policies. A new user, therefore, should require minimal installation of software before he/she is able to download and distribute the protected digital content. This is advantageous for the mobile service provider as it increases the ease with which the mobile service provider can get new mobile device users to use the services provided by the mobile service provider. There are some solutions available in the art that try to address the above-mentioned requirements. Content Policy System (CPS), a product from Beep Science AS, Norway is a Digital Rights Management solution for mobile service providers. This is a server-side solution that enables the mobile service provider to act as a payment collector for their own and partners' digital content, and ensures that copyright restrictions are enforced. The product also allows for superdistribution of digital content amongst users.

Another product RIGHTS|SYSTEM from Intertrust Technologies Corporation, California, USA supports Digital Rights Management of any kind of digital content. The associated technology offers its customers the choice of choosing their business model and distribution method. In this system, the digital content is assigned rights through a packager before it is distributed. The user can then buy the digital content and rights to its use by making appropriate payments to the retailer of the digital content. The product also allows for superdistribution of digital content amongst users. The product requires the digital content to be protected and be assigned rights to it before it is sent to the mobile service provider for further distribution. This inhibits the mobile service provider from applying flexible charging policies to the digital content.

In addition to the drawbacks mentioned above, both the products mentioned above are directed more towards DRM of computer networks rather than that on mobile networks.

U.S. patent application No. US20010052077A1, titled "Universal Mobile Id System And Method For Digital Rights Management", allows client devices and users to receive customized digital content from service provider's servers irrespective of service provider's prior knowledge of clients' configurations or users' preferences. The disclosed invention also prevents an authorized user from passing on digital content to another user who is not authorized to access the paid digital content. The information about the user and his/her mobile device is captured in a Universal Mobile ID (UMID) that enables the service provider's servers to customize digital content for clients for whom no prior knowledge is available. The application prevents an authorized user from passing on digital content to another user, who is not authorized to view the paid digital content. This is not desirable as the mobile service provider here limits the distribution of the digital content, thereby limiting the total number of users who may possibly pay for the digital content. Further, this requires every mobile device to be given a UMID. This again requires new users to formally "register" with the mobile service provider thereby restricting the total number of possible users.

World patent application number WO03003173A1, titled "Digital Rights Management", discloses a method for digital rights management in a network. A DRM server is responsible for issuing rights to requesting DRM clients. Once a DRM client obtains the rights, the rights are locked to a pseudo- or semi-unique node identifier obtained or calculated from the characteristics of the client. Rights of access to DRM-protected digital content are then granted subject to rights specifications and node identifier. This patent application attempts to grant rights of use to each mobile device instead of assigning rights to each application. This is not desirable as this leads to inflexibility in the implementation of DRM policies. It is desirable that the implementation of DRM policies is application (or digital content) based rather than user-based.

World patent application number WO03005145A2, titled "Digital Rights Management In A Mobile Communications Environment", provides a method to control the access, copying and/or transfer of digital contents by mobile, wireless devices using digital vouchers. The content provider can specify the terms and conditions for distribution of the primary digital content. A digital voucher is similar to a license that is stored in the mobile or wireless device. The digital voucher authorizes the mobile device to access digital content that may be located elsewhere in the network. A DRM agent that is present on a server computer generates the voucher. A user can download a copy of the digital content that he or she is allowed to view according to the terms and conditions of the digital voucher using the mobile device. A user can distribute digital content to others based on the conditions in the digital voucher, that is, if the user has sharing authorization. The application requires the digital voucher to be present on the mobile device. This is not desirable, as this requires some kind of "registration" of the mobile device with the mobile service provider. Further, the implementation of charging policies is done when the digital voucher is created. Instead, it is desirable that the charging policies be implemented at the instant of download, giving greater flexibility to the mobile service provider.

In addition to the points mentioned above, it is also desirable that the DRM system need not have any DRM agent software running on the mobile device itself to implement DRM policies. Another desirable feature, which is not provided in existing systems, is that of applying charging policies to the digital content at runtime while it is being downloaded by a user on the mobile device. This enables the mobile service provider enforce multiple charging policies for the same kind of digital content depending on different business models.

Hence, there is a need for a system for data distribution over a mobile network that allows charging of digital content as it is being delivered to the mobile device. This system must also be able to safeguard the rights of the content providers during the process of superdistribution of the digital content. Further, there is a need for a system that does not require any kind of DRM agent on the mobile device itself to implement DRM policies. Additionally, there is also a need for a system that does not require the content provider to assign fixed rights to all the digital content for DRM enforcement before it is ready for distribution through the mobile service provider. Therefore, the same digital content can be issued different rights for different users. Further, there is a need for a system that allows for the update and re-issue of a license for the same digital content.

SUMMARY

The present invention is directed to enabling the distribution and usage of Java based digital content protected by Digital Rights Management (DRM) policies.

An aim of the present invention is to distribute the protected digital content amongst a plurality of Java enabled mobile devices.

Another aim of the present invention is to enable implementation of DRM policies on J2ME applications.

Another aim of the present invention is to enable implementation of DRM policies on the digital content without the need of any DRM agent being available on the mobile device and without the need of any software installation on the mobile device.

Yet another aim of the present invention is to allow combined delivery and separate delivery of the license and the downloadable digital content.

Yet another aim of the invention is to enable the implementation of charging policies on the digital content during download of the digital content on the mobile device.

Yet another aim of the invention is to allow for update and re-issue of a license for the same digital content.

A further aim of the invention is to enable the mobile service provider to implement DRM enforcement on the digital content, so that the content provider does not need to package the digital content with DRM policies.

Another aim of the invention is the run time protection of Java based digital content prior to delivery to a mobile device.

In order to achieve the above-mentioned aims, the present invention discloses a novel method of distribution and usage of digital content protected by DRM policies. The first step of the method is the content provider registering the digital content with the mobile service provider. The next step, which is a part of the registration process, is generating a license for the digital content. Based on permissions set forth in the license, a particular digital content can be used, once it is downloaded on the mobile device. In other words, the license controls the usage of the digital content once it is downloaded onto the mobile device. In the next step, a mobile user discovers the digital content on the mobile service provider's web portal by means of the web browser on the mobile device. Once the user requests the download of some digital content, the same is delivered to the user's mobile device by the mobile service provider through either combined or separate delivery.

In combined delivery, the downloaded digital content includes a license embedded with it. In separate delivery, however, the license is not included with the digital content being downloaded. This enables forwarding of the digital content from one mobile device to another without the license, helping in the super-distribution of the digital content. In this case, the license is obtained from the mobile service provider when the digital content is used for the first time. In the next step, a user can use the digital content on the basis of the conditions in the license associated with it. When the license expires, the user is prompted to pay for upgrading the license for further use of the digital content. On the necessary payments made by the user, the license is upgraded and the user can continue to use the downloaded digital content.

The corresponding system needed to achieve the above-mentioned objectives consists of a content provider, for providing digital content; a mobile service provider that provides the voice and data communication services to users; a business gateway that resides with the mobile service provider, and a plurality of mobile devices. The business gateway acts as an interface for information exchange between the mobile service provider and the content provider. The mobile service provider further comprises a DRM Packager, a Content Server and a Licensing Server. The DRM Packager is responsible for generating a container that contains the rights to the usage of the digital content. The Content Server is used to deliver the digital content to the mobile device. The licensing server enables the mobile service provider to be a rights issuer. It is used for updating the license through a meta controller.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention discloses a system and method for enforcement of Digital Rights Management (DRM) policies on digital content for their subsequent distribution from a mobile service provider to mobile devices and subsequent usage of the digital content on mobile devices.

Figure 1:
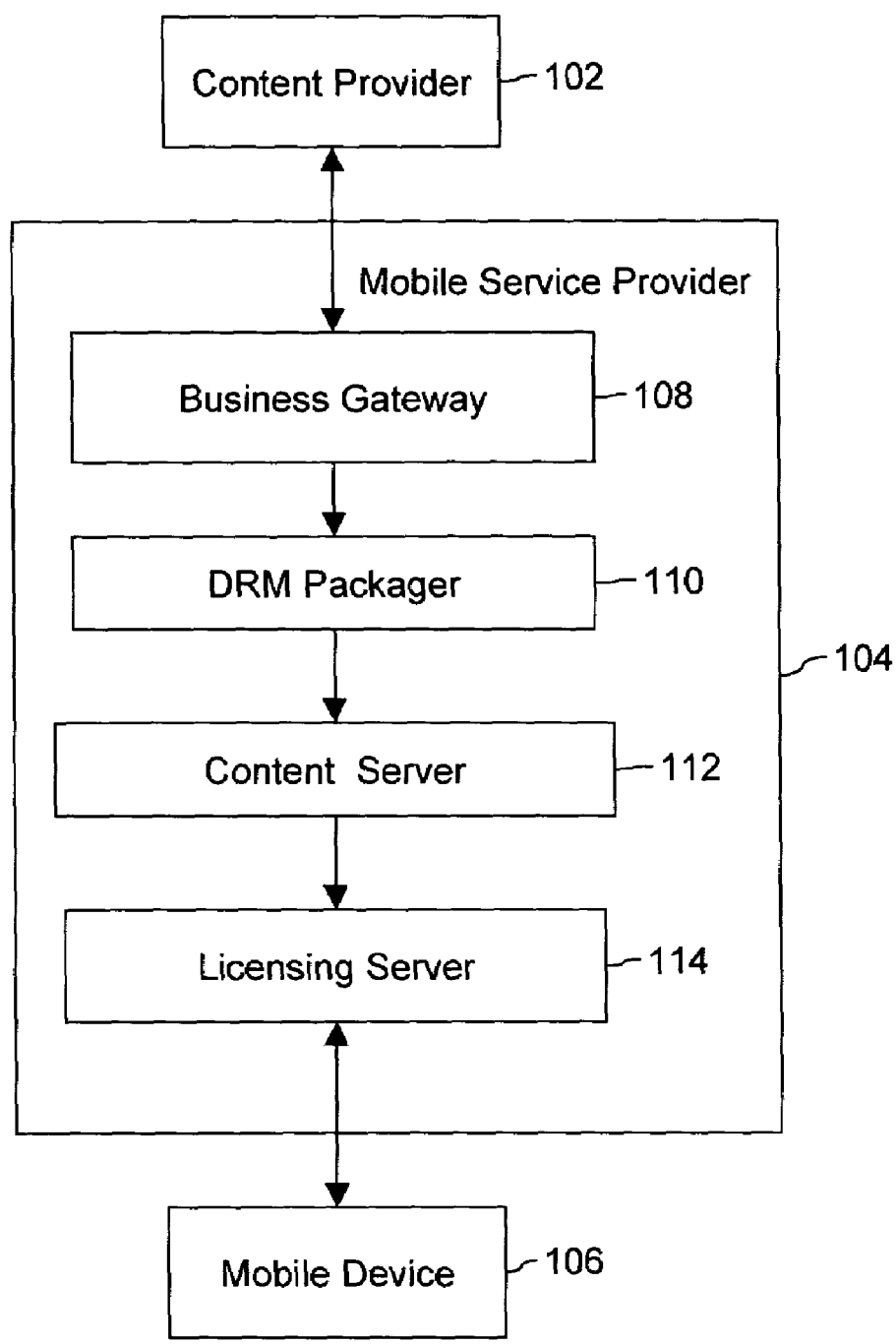
FIG. 1 is a block schematic of a system for distribution and management of digital content over mobile devices in accordance with a preferred embodiment of the present invention.

FIG. 1 is a block schematic of a system for distribution and management of digital content over mobile devices in accordance with a preferred embodiment of the present invention. The setup shows a content provider 102, a mobile service provider 104 and a mobile device 106. Content provider 102 provides digital content to mobile service provider 104 that can be downloaded on mobile device 106. The digital content that can be executed on mobile device 106 is also referred to as an application. Mobile service provider 104 is the provider of voice and data communication services to users of mobile device 106. Content provider 102 can host all kinds of digital content and applications that can be used on Java enabled mobile devices. All references to digital content and applications in this application refer to the digital content and applications that are Java based. That is, they are used on Java enabled mobile devices. This digital content is available for usage by mobile device 106 through mobile service provider 104. In addition to this, mobile service provider 104 may also host some of the digital content. Alternatively, mobile service provider 104 can host all of the digital content and in such case there is no need for content provider 102.

A business gateway 108 acts as an interface for information exchange between mobile service provider 104 and content provider 102 and vice versa. Business gateway 108 as described in a preferred embodiment of the present invention, has been described in greater detail in patent application titled "Policy Service System and Methodology", filed on Jun. 23, 2003, as application Ser. No. 10/601,397. The patent application is incorporated herein by reference as if fully set forth herein. Business gateway 108 authenticates content provider 102 to ensure that the digital content is being provided by a trusted content provider 102. Subsequently, content provider 102 is allowed to provide the digital content to mobile service provider 104 via business gateway 108. Mobile service provider 104 further comprises a DRM Packager 110, a Content Server 112, and a Licensing Server 114.

DRM Packager 110 is present on mobile service provider 104 and is responsible for generating rights to the usage of the digital content. In effect, DRM Packager 110 is responsible for generating a container, which is a digital wrapper around the digital content. Hence, the container consists of the digital content and optional digital rights that govern the usage of the digital content. The container enforces the digital rights on mobile device 106. The set of digital rights associated with the digital content is a license. Content server 112 is used to deliver the digital content to mobile device 106. FIG. 1 shows content server 112 to be present as a part of mobile service provider 104, in a preferred embodiment. However, this is not a necessary requirement. In an alternate embodiment, if mobile service provider 104 does not host the digital content, content server 112 is present outside mobile service provider 104.

Licensing server 114 accepts HTTP (Hypertext Transfer Protocol) requests coming from mobile device 106. The address of licensing server 114 is embedded in the container that comes with the downloaded digital content. Hence, when the user makes a payment or requests for license update, the request directly goes to licensing server 114. If the user requests an update of the license, a Meta Controller then returns the possible upgrade options for the license. The Meta Controller as described in a preferred embodiment of the present invention, has been described in greater detail in patent application titled "Policy Service System and Methodology", as described above. Licensing server 114 then sends an updated license to the user after the user agrees to make the required payment. The container, present on mobile device 106, updates the license. The payment is made transparently by means of a billing system. For example, if the user has subscribed through a pre-paid account, the user's account is charged for the required amount. If the user has a post-paid account, the user is charged in the monthly bill. In an alternate embodiment, the user can also be charged through a payment site. This depends on the charging model of the service decided by mobile service provider 104 and content provider 102 when the service is created.

In a preferred embodiment, mobile device 106 is Java enabled. A Java enabled mobile device means mobile device 106 is capable of running all J2ME applications. J2ME applications run on mobile device 106 with the help of virtual machines. Examples of such virtual machines are Java Virtual Machine (JVM), Kilobyte Virtual Machine (KVM). These virtual machines are well known in the prior art.

Figure 2A:
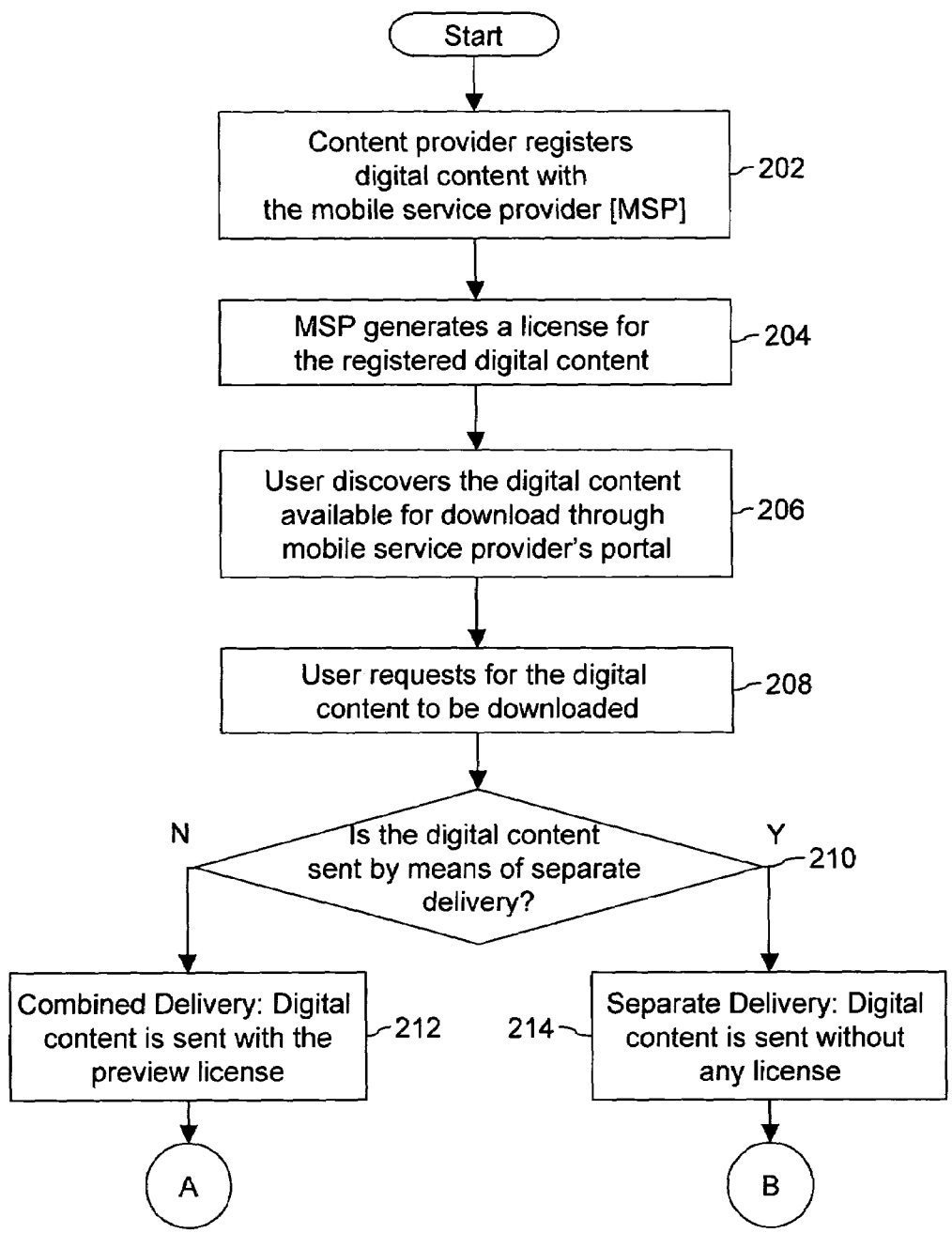
FIG. 2 is a flow chart depicting basic steps of the invention in accordance with the preferred embodiment of the present invention.
Figure 2B:
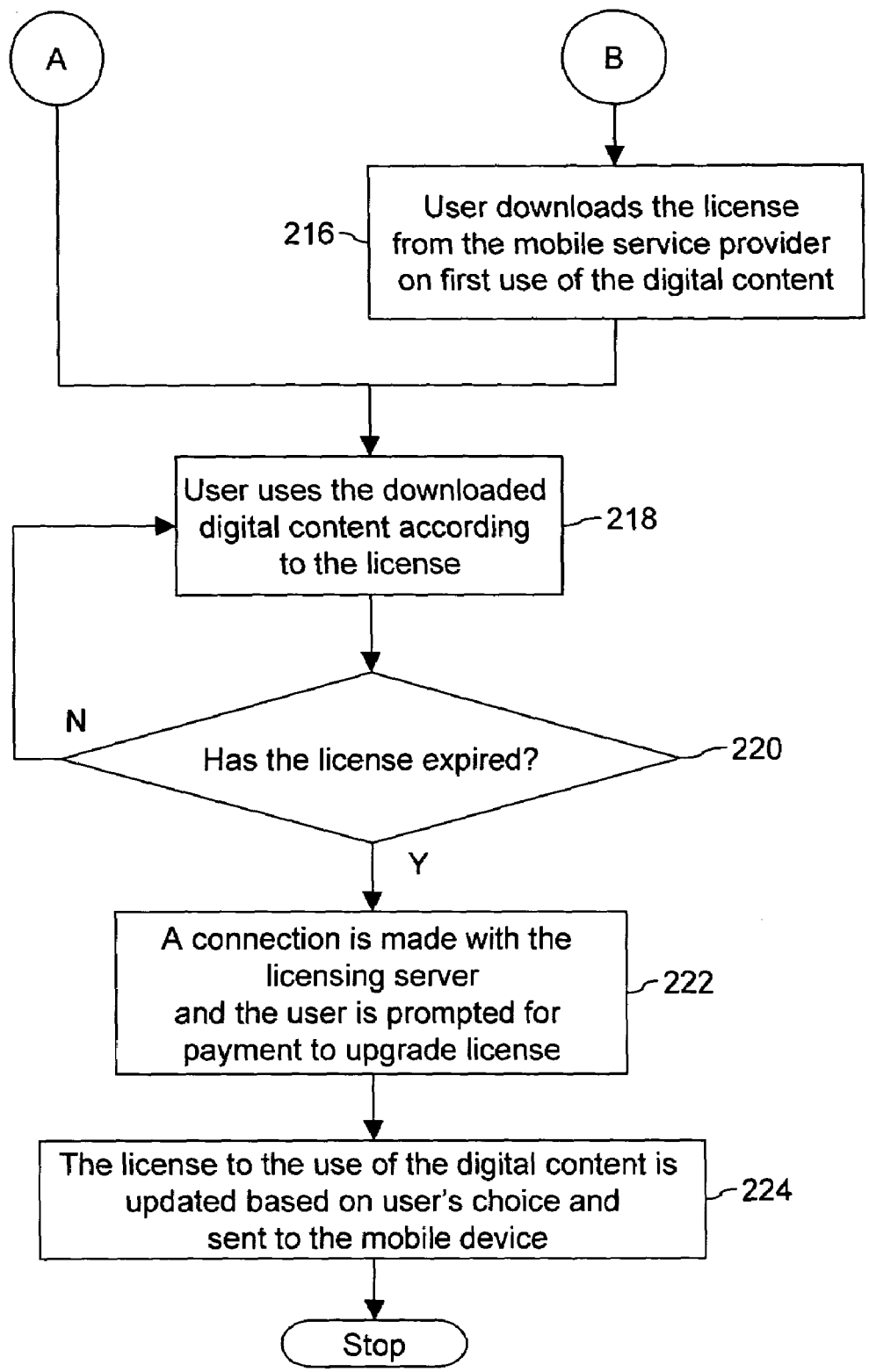

FIG. 2 is a flow chart depicting the basic steps of the invention in accordance with a preferred embodiment of the present invention. To make the digital content hosted by content provider 102 available to the mobile device user, content provider 102 needs to register the digital content with mobile service provider 104, as shown in step 202. The registration process includes generation of the license that determines the default usage conditions of the digital content and enables charging for the downloaded content, as shown in step 204. The license also prevents the digital content to be forwarded to other users of mobile device 106. This prevents illegal distribution of the digital content amongst users of mobile devices similar to mobile device 106, once content has been downloaded onto mobile device 106. Once downloaded, the license is stored in memory of mobile device 106 in area called Record Management Store (RMS). The RMS can be accessed only by the digital content for which the license is created. No other digital content is given the rights to access this memory space in mobile device 106. Even if the digital content is copied to another mobile device similar to mobile device 106, the digital content cannot be used because the corresponding license will not be present in its RMS. This method ensures that the digital content cannot be used even if it is copied to some other mobile device. Thus, the data in the RMS can only be read only by a related digital content and cannot be copied to another mobile device.

The mobile user finds out about the digital content available for download through a web browser that is present on mobile device 106 by surfing a web portal of mobile service provider 104, as shown in step 206. In step 208, the mobile user requests and initiates the download of the digital content that he/she intends to use. The delivery of the digital content to mobile device 106 is done by Content Server 112. The delivery of the digital content can be done in two different ways—combined and separate delivery. The kind of delivery is chosen at the time of delivering the digital content is decided by the agreement between mobile service provider 104 and content provider 102. This is accomplished at step 210.

In combined delivery, the digital content wrapped with the license determining the usage conditions of the digital content is sent to mobile device 106 on request from the mobile device user, as shown in step 212. In separate delivery, the digital content is delivered to the mobile device user without any license embedded with it, as shown in step 214. In this case, the license is obtained from mobile service provider 104 when the digital content is used for the first time, as shown in step 216. Separate delivery in this way facilitates superdistribution where the digital content/application can be forwarded to users of mobile device similar to mobile device 106 without the license. A mobile device user who has received the digital content from another mobile device user can use the digital content in the same manner as mobile device user who received the application directly from mobile service provider 104 on the basis of the conditions of use specified in the attached license.

A user of mobile device 106 can use the downloaded content as per the conditions set in the license, as shown in step 218. At step 220, it is checked whether the usage conditions that are specified in the license have expired. If yes, a connection of mobile device 106 is made with licensing server 114. The user is then given the options, such as the option of either buying the digital content for unlimited use or upgrading the license for a specified number of accesses. Based on the user's choice, the user is prompted for fulfilling certain preconditions, such as making necessary payments. This is shown in step 222. After the user has fulfilled the required preconditions, licensing server 114 upgrades the license and delivers the new license to mobile device 106. This is shown in step 224. The generation, updating of the license and the implementation of rights through the license for use of the digital content is achieved through Rights Workflow.

Rights Workflow as described in a preferred embodiment of the present invention, has been described in greater detail in patent application titled "Policy Service System and Methodology" as described above. A brief description of Rights Workflow is provided here.

Rights Workflow defines the execution message sequence flow, that is, it allows for the rights to be processed through a series of workflow steps. A particular digital content can have one or more workflows associated with it. Each workflow is executed based on prevailing conditions. When a request for a license is made, licensing server 114, interrogates the workflow to ensure that the workflow integrity is maintained.

The workflow has a start state with multiple end-points. That is, the digital content can be assigned different rights at different stages of use. This is specified by a Rights Information Model. The rights information model specifies the rights associated with the digital content, the time period of the rights, the access conditions and the associated fees. The generated license comprises constraints parameters and requirement parameters. The constraints parameters are used to enhance the permissions by allowing fine-grained control of the application. The constraints parameters comprise a count of the number of times the application is permitted for use and the shelf life of the digital content. After the expiry of the shelf life mentioned in the license, the digital content cannot be used without getting the license renewed or updated. The requirement parameters, however, are the obligations that need to be fulfilled in order to exercise the permissions. For example, the requirement of paying $5 each time a video is played, without which the video will not be played is a requirement parameter. As a combination, the constraints parameters and the requirement parameters enable the enforcement of multiple business models.

After the digital content is downloaded on mobile device 106, the container maintains the current state of the license. The container is described in greater details later in the description.

Figure 3:
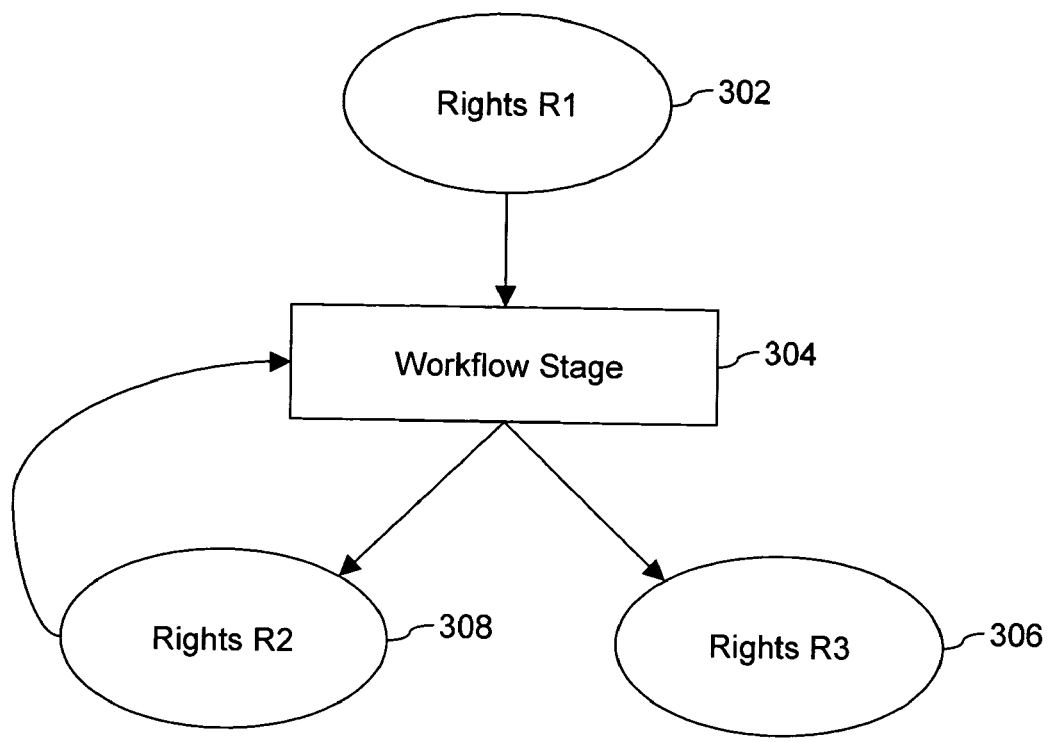
FIG. 3 illustrates a sample workflow in accordance with the preferred embodiment of the present invention.

FIG. 3 illustrates a sample workflow in accordance with the preferred embodiment of the present invention. To illustrate how the Rights Workflow and Rights Information Models work as a series of workflow steps, consider three different rights as follows:

Rights R1: Rights to use for 2 times for free.

Constraints parameter: Use allowed for 2 times

Requirement parameter: None

Rights R2: Rights to use for 5 times for a payment of $1.

Constraints parameter: Use allowed for 5 times

Requirement parameter: $1

Rights R3: Rights to use for unlimited number of times for $5.

Constraints parameter: Use allowed for unlimited number of times.

Requirement parameter: $5

In step 302 of the workflow, the license with rights R1 that is associated with a particular digital content is sent with downloaded digital content on mobile device 106.

The container keeps track of the number of times the digital content has already been used and maintains the stage of the workflow. When the number of times the digital content is used becomes greater than two, a connection is made with licensing server 114. Licensing server 114 contacts the Meta Controller that checks the stage of workflow. The Meta Controller then returns the possible upgrade options, that is, rights R2 or rights R3 in the present example. This is achieved in step 304 of the workflow. A license is created based on the rights returned by the Meta Controller to licensing server 114. If rights R3 are chosen, the same is delivered to the user and mobile device 106 does not need to contact licensing server 114 again, as shown in step 306 of the workflow. However, if rights R2 are chosen, the same is delivered to the user, as shown in step 308 of the workflow. In this case, the process of upgrading is repeated on the expiry of rights R2 and the user is again given the choice of either opting for rights R2 or rights R3.

A license to any digital content is constructed using a combination of several license parameters.

For example, a license containing rights can look like:

```
<license-data>
    <license-constraints>
        <name>DefaultConstraintCount</name>
        <type>0</type>
        <value>2</value>
    </license-constraints>
    <license-options>
        <name>DefaultRightPayForFullRights</name>
        <caption>Unlimited for Price USD 5</caption>
    </license-options>
    <license-options>
        <name>DefaultRightPayFor5Views</name>
        <caption>Play 2 times for Price 1</caption>
    </license-options>
</license-data>
```

This is a license for unlimited usage for 5 dollars.

Figure 4A:
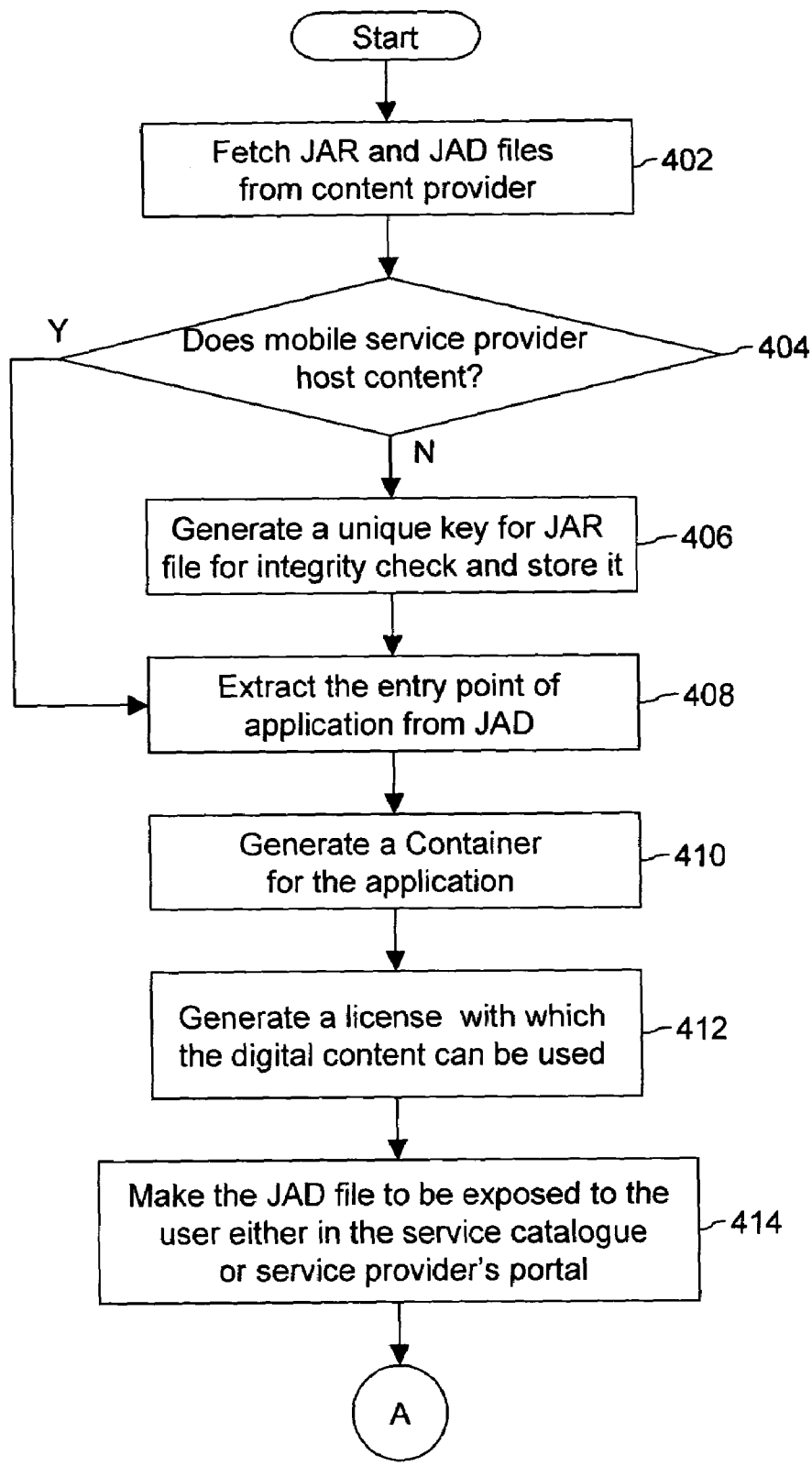
FIG. 4 is a flow chart depicting the method of registration of the digital content with a mobile service provider in accordance with the preferred embodiment of the present invention.
Figure 4B:
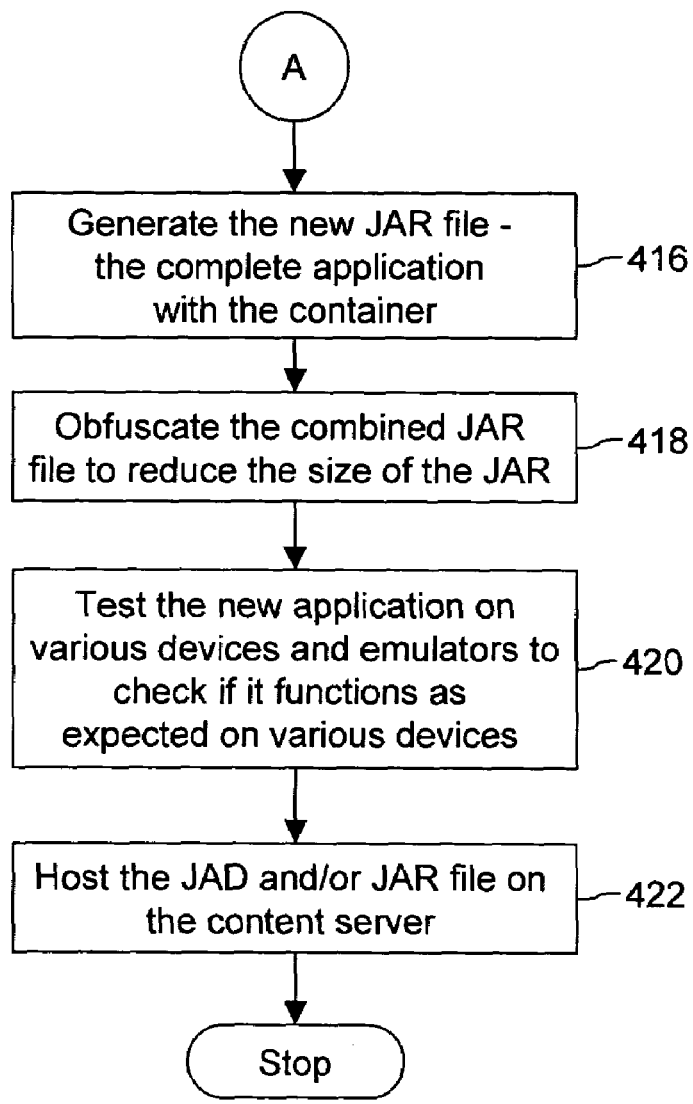

FIG. 4 is a flow chart depicting the method of registration of the digital content with a mobile service provider in accordance with a preferred embodiment of the present invention. At step 402, mobile service provider 104 obtains the digital content from content provider 102 in the form of JAD and JAR files. JAR is the acronym for Java Archive. A JAR file is a file that contains the class, image, and sound files for a Java applet gathered into a single file and compressed for faster downloading to the user's Web browser. The JAR format is based on the zip file format. Therefore, the digital content is encoded in the JAR format to reduce its size. Further, JAR encoded content is compatible for use with Java-enabled mobile devices. JAD is the acronym for Java Application Descriptor. JAD is a description of the Java application. A JAD contains the description of the JAR in terms of the size of the JAR, the location of where the JAR resides, the version of the JAR etc. In a preferred embodiment, the content from content provider 102 is obtained by "pull" technology. The server (on mobile service provider 104) fetches the content (based on the URL provided) from content provider 102 after the registration process. In an alternate embodiment, content provider 102 can also provide content on the basis of "push" technology. In such a case, content provider 102 updates the content periodically, or whenever there is an update in the hosted contents.

At step 404, it is checked whether content provider 102 or mobile service provider 104 hosts the digital content. If content provider 102 hosts the digital content, a unique key for the JAR file fetched in step 402 is created, as shown in step 406. Any well-known encryption algorithm, such as MD5, can be used to generate the key from the JAD. A sample key may look like 6b696d697461435355504552454e47. The key is generated at the time of registration and is stored in a database inside mobile service provider 104. When the user tries to download, this key is generated again and checked against the key stored in the database. This ensures that the digital content is not tampered with and it is free from software viruses.

At step 408, the entry point of the application is extracted from the JAD file. After extracting the entry point of the digital content being registered, at step 410, a container is generated for the digital content. The container is a Digital Rights Management layer that is wrapped around the digital content to be protected to prevent its misuse. The container is generated on the basis of requirements of content provider 102.

The above point can be explained further by means of an example.

MIDlet-Name: TicTacToe
MIDlet-Vendor: Forum Nokia
MIDlet-Version: 1.1.0
MIDlet-Jar-Size: 8949
MIDlet-Jar-URL: TicTacToe.jar
MIDlet-1: TicTacToe, /tictactoe.png, example.tictactoe.TicTacToeMIDlet
MIDlet-Description: A Brief Introduction to MIDP Graphics The above is an example of a JAD file with an entry point as TicTacToeMIDlet. This entry point to the digital content is extracted from the JAD file and it is replaced by another entry point. This is the entry point for the container used for protection of the digital content. In the present example, example.tictactoe.TicTacToeMIDlet is replaced by example.tictactoe.JulyCDWrapper. The resulting file is as shown below:

MIDlet-Name: TicTacToe
MIDlet-Vendor: Forum Nokia
MIDlet-Version: 1.1.0
MIDlet-Jar-Size: 15921
MIDlet-Jar-URL: TicTacToe.jar
MIDlet-1: TicTacToe, /tictactoe.png, example.tictactoe.JulyCDWrapper
MIDlet-Description: A Brief Introduction to MIDP Graphics At step 412, the license is generated. The license contains a set of permissions, constraints, and requirements for the application. It defines the permission parameters that grant rights to the application.

After the creation of the license, a new JAD file is created at step 414. This JAD file is exposed to the user who accesses the file through the web browser of mobile device 106. In a preferred embodiment, the JAD file is reflected as a service in the service catalogue of mobile service provider 104. After the creation of the JAD file, a new JAR file is created at step 416. The resulting file is the complete application with the container containing the license, and the digital content.

At step 418, the JAR file created in step 416 is encoded to reduce its size and to make reverse engineering of the protected digital content as difficult as possible. The digital content and the license that is wrapped to the digital content are in Java. There is a danger that this application is reengineered back to Java code. Thus, in a preferred embodiment, obfuscation of the Java application is done. Obfuscation can be done on the class name, method names and attribute names, which form a large part of the program code. The business logic of the code and any data in the code is not changed. The process of obfuscation can be explained by means of a simple example: method getParameters( ) is changed to a( ) after obfuscation. This leads to reduction in the size of the application and the wrapped rights object.

At step 420, the JAD and JAR files are tested on a variety of devices and emulators present on mobile service provider 104 to check whether the files generated as a result of the registration process function as expected or not. In order to test the new JAR, a number of toolkits existing in the art may be used. These toolkits simulate the manner in which a license is processed/executed when the user downloads content on the device. Some examples of these toolkits are Sun's J2ME Toolkit manufactured by Sun Microsystems, Santa Clara, Calif., US, Sprint PCS Toolkit manufactured by Sprint PCS, Overland Park, Kans., US and Nokia 7210 Emulator Phone, Nokia 6650 Emulator Phone and Nokia 7210 Real Phone manufactured by Nokia, Espoo, Finland.

Finally, at step 422, the JAD files are stored on Content Server 112 so that they are available for download. This completes the process of registration of the digital content from content provider 102 on mobile service provider 104. In a preferred embodiment, the digital content made available at content server 112 is in the form of content descriptors. Content descriptors as described in a preferred embodiment of the present invention, has been described in greater detail in patent application titled "Policy Service System and Methodology" as described above.

If mobile service provider 104 hosts the digital content instead of content provider 102 as checked in step 404, step 406, as already discussed, is skipped. Further, in step 422, both the JAD and JAR files are stored on Content Server 112 so that they are available for download. The rest of the steps for registration of the digital content remain the same as described above.

During the process of registration of the digital content with mobile service provider 104, content provider 102 can also participate in the definition of parameters that form the license. Mobile service provider 104 fetches the digital content and interprets the parameters. This is done by means of Open Digital Rights Language (ODRL). ODRL is a rights expression language. The ODRL specification supports an extensible language and vocabulary (data dictionary) for the expression of terms and conditions over any digital content including permissions, constraints, obligations, conditions, and offers and agreements with rights holders. The ODRL specification does not have any licensing requirements and is free to use. The specifications of ODRL can be obtained from www.odrl.net. Using this scheme, the present invention can be used to create a new license for the digital content for which the original license provided by content provider 102 has expired.

Figure 5:
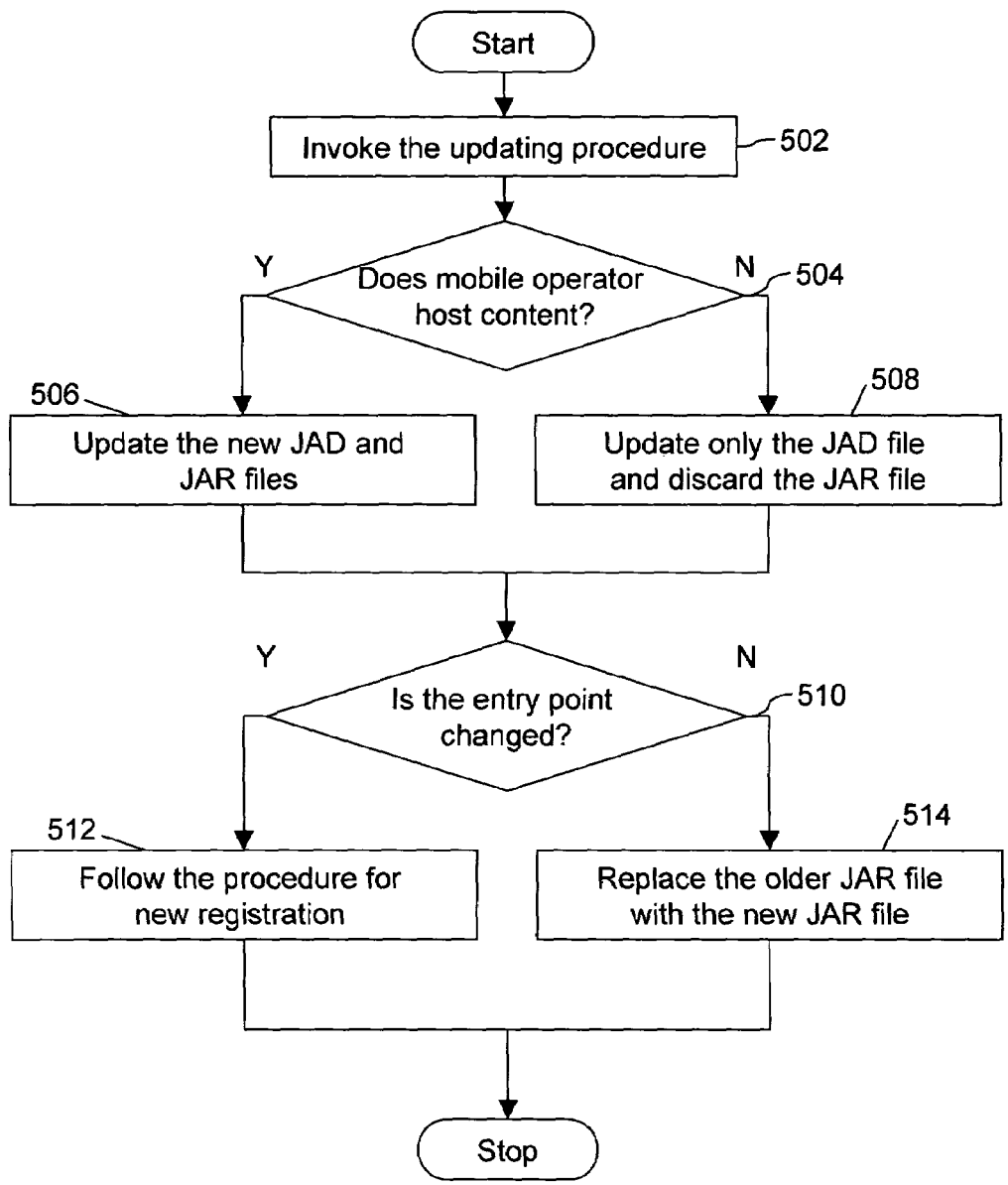
FIG. 5 is a flow chart depicting the method of updating of digital content with the mobile service provider in accordance with a preferred embodiment of the present invention.

FIG. 5 is a flow chart depicting the method of updating of digital content with the mobile service provider in accordance with a preferred embodiment of the present invention. At step 502, content provider 102 invokes the updating procedure. As already mentioned, the updating procedure can be based either on "push" technology, or on "pull" technology. At step 504, it is checked whether mobile service provider 104 hosts the digital content or content provider 102 hosts the digital content. If mobile service provider 104 hosts the digital content, both the JAD and JAR files for the digital content are updated at step 506. In case the content provider 102 hosts the digital content, only the JAD file is updated and old JAR file is discarded as depicted in step 508. Subsequently, at step 510, it is checked whether the entry point of the digital content is changed or not. If the entry point of the digital content is changed, then the procedure for registration as described earlier and shown in FIG. 4 is followed, as depicted in step 512. If the entry point of the digital content is not changed, at step 514, the old JAR file is simply replaced by the new JAR file. This step concludes the process of updating the digital content.

Figure 6:
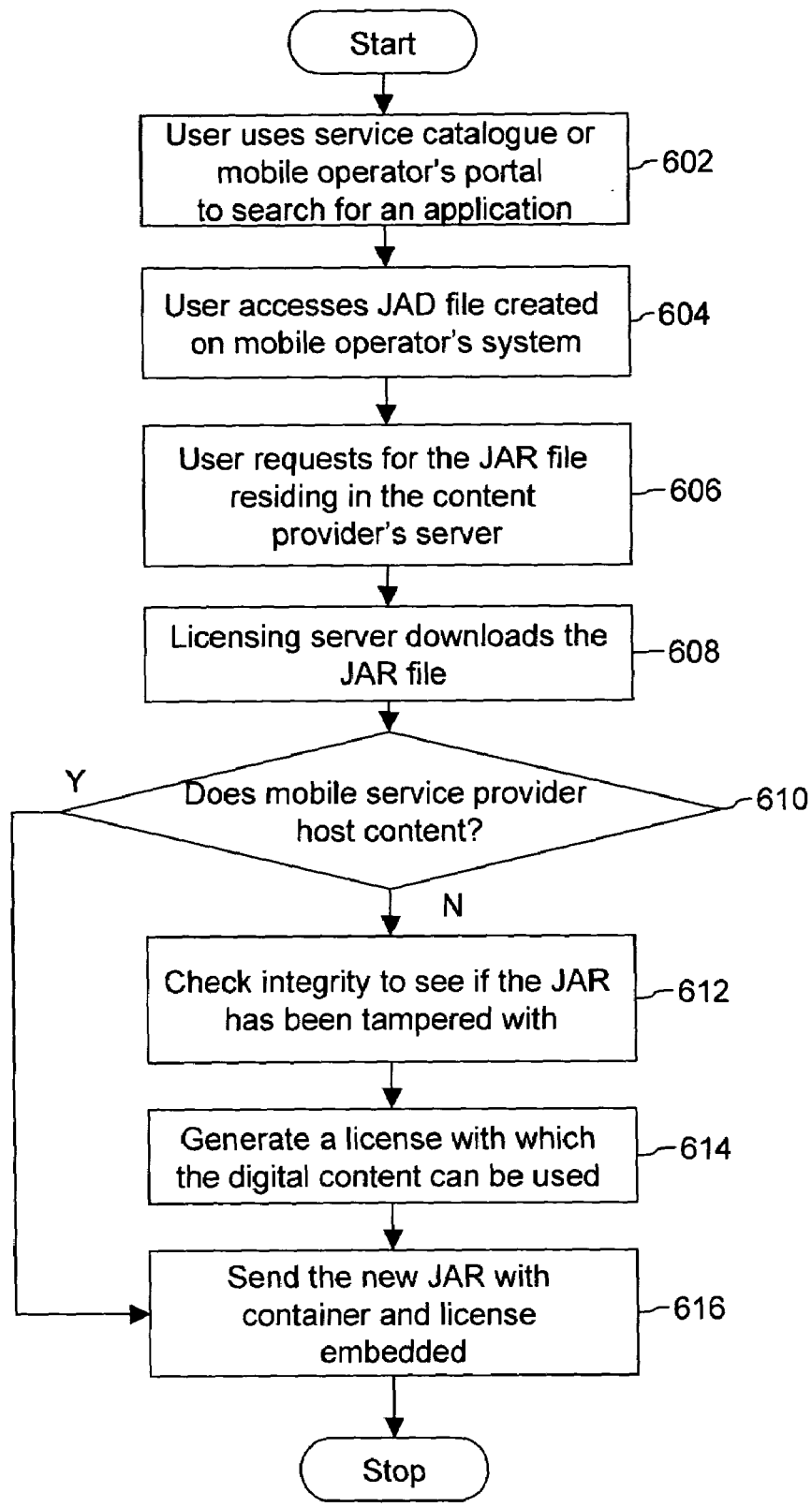
FIG. 6 is a flow chart depicting the method of downloading of digital content for combined delivery in accordance with a preferred embodiment of the present invention.

FIG. 6 is a flow chart depicting the method of downloading of the digital content for combined delivery in accordance with a preferred embodiment of the present invention. In step 602, the user of mobile device 106 uses a service catalogue to search by means of web browser present on mobile device 106 for the digital content that he/she may want to download. The user can also search for the digital content by accessing the web portal hosted by mobile service provider 104. In this case, the user accesses the web portal by means of a computer connected to the Internet. The service catalogue as described in a preferred embodiment of the present invention, has been described in greater detail in patent application titled "Policy Service System and Methodology", as described above. In step 604, the user accesses the JAD file that is created on mobile service provider 104. In case the user wants to download the digital content, the user requests for the JAR file residing in a server hosted by content provider 102, as shown in step 606. In step 608, licensing server 114 downloads the JAR file from content server 112. In step 610, a check is performed to find whether the digital content is hosted by mobile service provider 104 or content provider 102. If content provider 102 hosts the digital content, an integrity check is performed to check whether the digital content has been tampered with and to ensure that the digital content is not affected by a software virus, as shown in step 612. If the key generated for the digital content is the same as the key for the digital content registered with business gateway 108, the integrity check is successful. In step 614, the license governing the use of the digital content is generated. In case mobile service provider 104 hosts the digital content, the integrity check as described in step 612 does not need to be performed. Further, the generation of the license as in step 614 is not needed as the license is generated during the registration process itself. In step 616, the new JAR file is sent to the user with the container containing the license.

Figure 7:
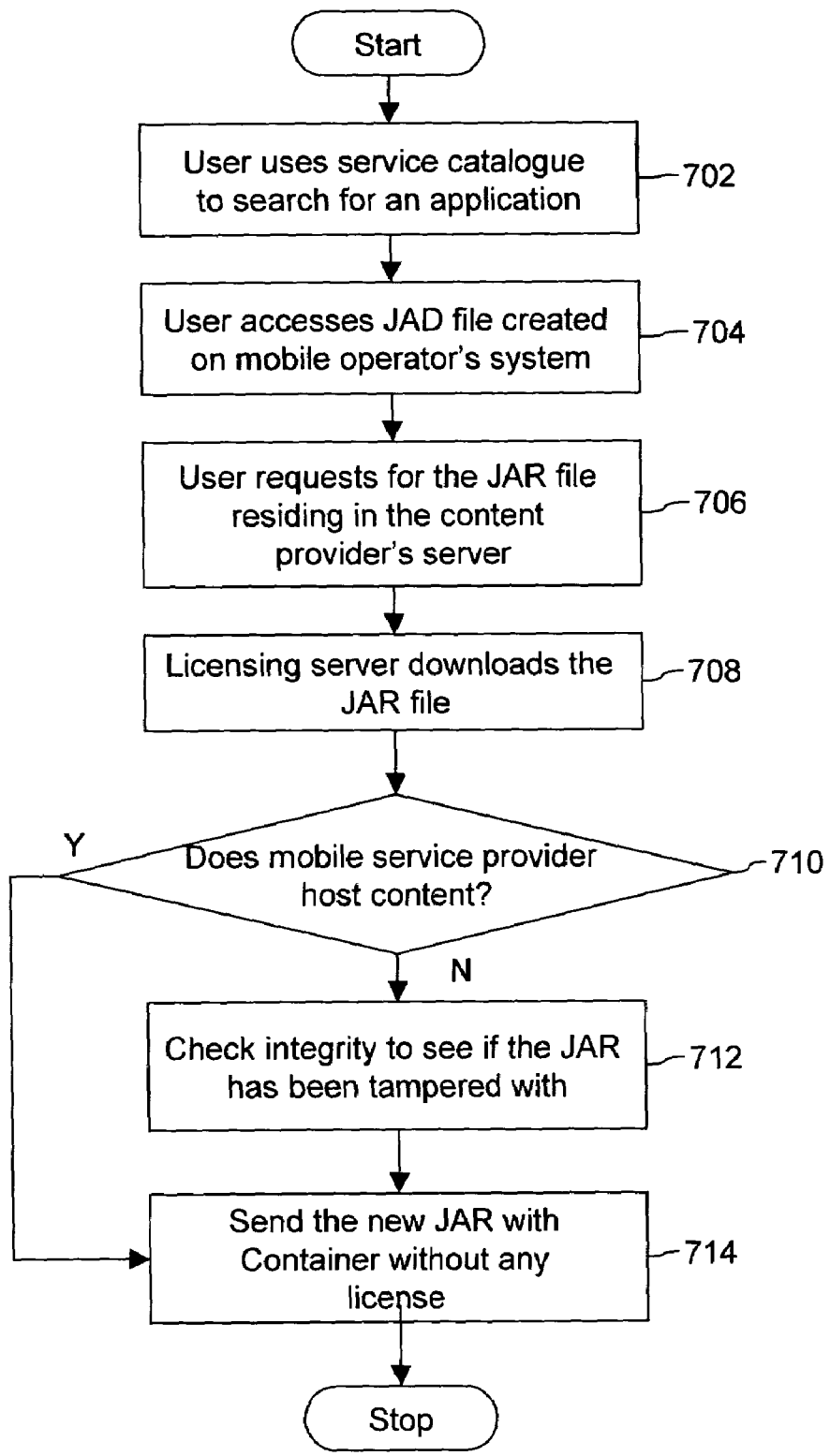
FIG. 7 is a flow chart depicting the method of downloading of digital content for separate delivery in accordance with a preferred embodiment of the present invention.

FIG. 7 is a flow chart depicting the method of downloading of digital content for separate delivery in accordance with a preferred embodiment of the present invention. In step 702, the user of mobile device 106 uses a service catalogue to search by means of web browser present on mobile device 106 for the application that he/she may want to download by accessing the web portal hosted by mobile service provider 104. In step 704, the user accesses the JAD file that is created on mobile service provider 104. In case the user wants to download the digital content, the user requests the JAR file residing in a server hosted content provider 102, as shown in step 706. In step 708, licensing server 114 downloads the JAR file from content server 112. In step 710, a check is performed to find whether the digital content is hosted by mobile service provider 104 or content provider 102. If content provider 102 hosts the digital content, an integrity check is performed to check whether the digital content has been tampered with and to ensure that the digital content is not affected by a software virus, as shown in step 712. If the key generated for the digital content is the same as the key for the digital content registered with business gateway 108, the integrity check is successful. In the case when mobile service provider 104 hosts the digital content, the integrity check as described in step 712 does not need to be performed. In step 714, the new JAR file is sent to the user with the embedded container but without the license in it.

Figure 8:
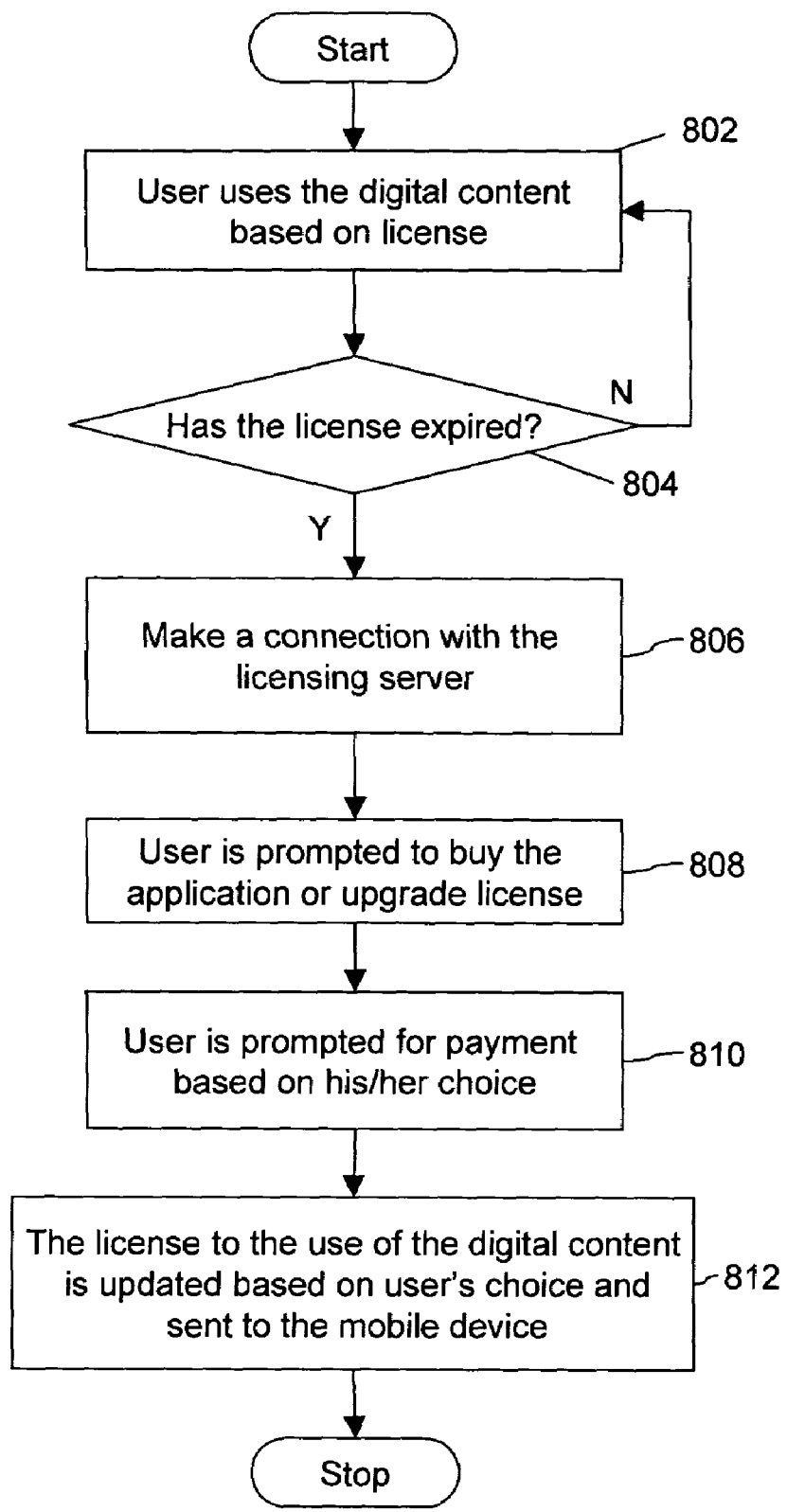
FIG. 8 is a flow chart depicting the method of usage of digital content in case of combined delivery in accordance with a preferred embodiment of the present invention.

FIG. 8 is a flow chart depicting the method of usage of digital content in case of combined delivery in accordance with a preferred embodiment of the present invention. In step 802, when the user first uses the digital content downloaded on mobile device 106, the user uses the digital content based on the license that is embedded with the digital content. The user uses the digital content by means of controls and user interface present on mobile device 106. In step 804, it is checked whether the license has expired or not. If the license is still valid, the user is allowed to use the digital content, again based on the conditions in the license. However, if in step 804, it is found that the license has expired, a connection between mobile device 106 and licensing server 114 is established. On connection with licensing server 114, the user is prompted to buy the digital content or upgrade the present license, as shown in step 808. In step 810, the user is prompted to make necessary payments based on his/her choice. In step 812, the license is updated based on the user's preference and the updated license is delivered to mobile device 106.

Figure 9A:
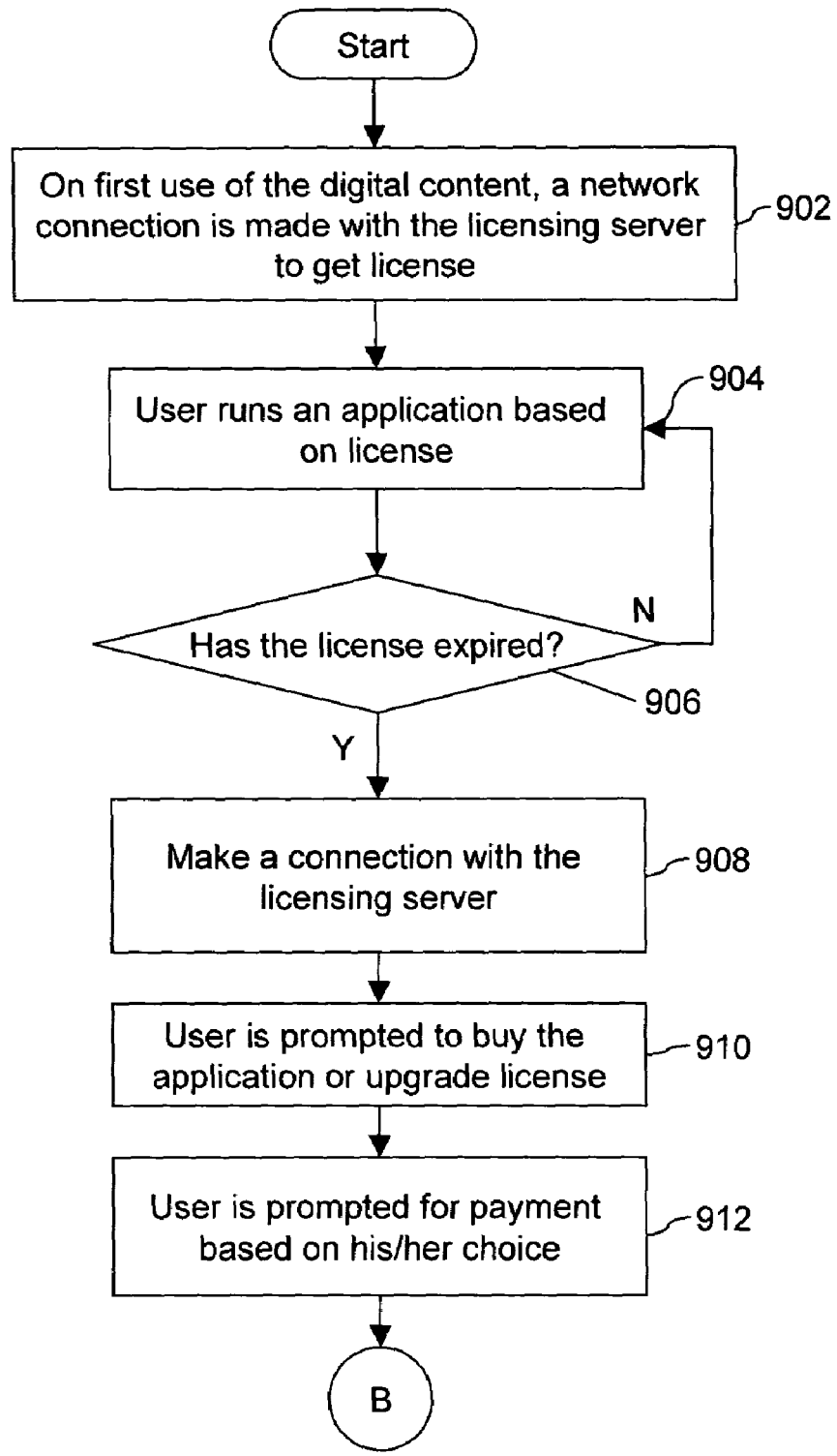
FIG. 9 is a flow chart depicting the method of usage of digital content in case of separate delivery in accordance with a preferred embodiment of the present invention.
Figure 9B:
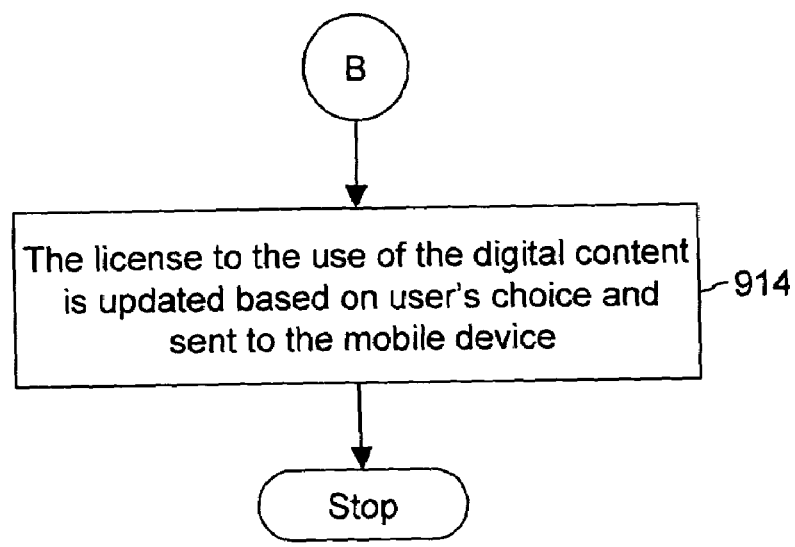

FIG. 9 is a flow chart depicting the method of usage of digital content in case of separate delivery in accordance with a preferred embodiment of the present invention. In step 902, on the first launch of the application by the user, a connection is made between mobile device 106 and licensing server 114 to obtain the license associated with the application. After obtaining the license, the user can use the digital content based on the conditions defined in the license, as shown in step 904. In step 906, it is checked whether the license has expired or not. If the license is still valid, the user is allowed to use the digital content, again based on the conditions in the license. The user uses the digital content by means of the controls and the user interface present on mobile device 106. However, if in step 906, it is found that the license has expired, a connection between mobile device 106 and licensing server 114 is made. On connection with licensing server 114, the user is prompted to buy the application or upgrade the present license, as shown in step 910. In step 912, the user is prompted to make necessary payments based on his/her choice. In step 914, the license is updated based on the user's preference and the updated license is delivered to mobile device 106.

To summarize, in a preferred embodiment of the invention, a mobile service provider provides digital content to mobile users using Java enabled mobile devices. In a preferred embodiment, the digital content is provided in collaboration with a content provider. The mobile service provider can also host the digital content. To make the digital content available to the mobile users, the digital content needs to be registered with the mobile service provider. Further, to protect the digital content and to regulate how the digital content is used by mobile users, a license is generated for the digital content as a part of the registration process. The license defines the initial conditions based on which, that particular digital content can be used, once it is downloaded on the mobile device. The license enables the implementation of DRM policies on the digital content. The license also prevents the digital content to be forwarded or copied to other users.

The mobile user discovers the digital content on the mobile service provider's web portal or by a service catalogue present on the mobile service provider by means of a web browser on the mobile device. Once a user requests the download of some digital content, the same is delivered to the user's mobile device by the mobile service provider. There are two methods of delivering the digital content to the mobile user—combined and separate delivery. In combined delivery, the downloaded digital content includes a license embedded with it. In separate delivery, however, the license is not included with the digital content being downloaded. In this case, the license is obtained from the mobile service provider when the digital content is used for the first time. Separate delivery in this way facilitates superdistribution where the digital content can be forwarded without the license.

A user can use the digital content on the basis of the conditions in the license associated with it. When the license expires, the user is prompted to pay for upgrading the license for further use of the digital content. On the necessary payments being made by the user, the license is upgraded and the user can continue to use the downloaded digital content. The system and method as described above provides several advantages. One advantage of the invention is that it enables a server side implementation of DRM. That is, it enables implementation of DRM policies on the digital content without the need of any DRM agent being available on the mobile device and without the need of any software installation on the mobile device to implement licensing. Another advantage of the invention is to enable the implementation of charging policies on the digital content during download of the digital content on the mobile device. Further, the invention enables the mobile service provider to implement DRM enforcement on the digital content, so that the content provider does not need to package the digital content with DRM policies.

The system, as described in the present invention or any of its components, may be embodied in the form of a processing machine. Typical examples of a processing machine include a general-purpose computer, a programmed microprocessor, a micro-controller, a peripheral integrated circuit element, and other devices or arrangements of devices that are capable of implementing the steps that constitute the method of the present invention.

The processing machine executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that the various processing machines and/or storage elements may not be physically located in the same geographical location. The processing machines and/or storage elements may be located in geographically distinct locations and connected to each other to enable communication. Various communication technologies may be used to enable communication between the processing machines and/or storage elements. Such technologies include session of the processing machines and/or storage elements, in the form of a network. The network can be an intranet, an extranet, the Internet or any client server models that enable communication. Such communication technologies may use various protocols such as TCP/IP, UDP, ATM or OSI.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for enabling the distribution and usage of digital content protected by Digital Rights Management (DRM) policies, the digital content being distributed to mobile users through a mobile service provider, the digital content being used by mobile users through their respective mobile devices, the mobile devices being Java enabled, the DRM policies being implemented by a wrapper which is added to the digital content, the DRM policies further being implemented without the need of a DRM agent on the mobile device, the method comprising:
   a. the mobile service provider associating Digital Rights Management policies with the digital content wherein the wrapper is added to the digital content for facilitating implementation of DRM policies on the mobile device;
   b. downloading the digital content along with the wrapper onto the mobile device;
   c. the wrapper facilitating download of a license onto the mobile device, the license being generated on the basis of Digital Rights Management policies associated with the downloaded digital content;
   d. the mobile user fulfilling preconditions for the use of the digital content, the preconditions being defined in accordance with the license; and
   e. the wrapper implementing the DRM policies on the mobile device wherein the wrapper allows the mobile user using to use the digital content in accordance with the license; and
   f. the wrapper allowing a purchase of a license when the existing license expires without the need to download the digital content again.

2. The method as recited in claim 1 wherein the digital content to be downloaded is provided by a content provider to the mobile service provider.

3. The method as recited in claim 1 wherein the digital content to be downloaded is hosted by the mobile service provider.

4. The method as recited in claim 1 wherein the license is downloaded onto the mobile device along with the wrapper and the digital content, allowing the mobile user to use the digital content in accordance with the license.

5. The method as recited in claim 1 further comprising the step of registering the digital contents with the mobile service provider.

6. The method as recited in claim 5 wherein the step of registering the digital content with the mobile service provider comprises the steps of:
   a. obtaining digital content files from the content provider;
   b. generating the wrapper for the digital content for implementing the DRM policies;
   c. generating a license file with default settings;
   d. associating a rights workflow with the digital content;
   e. updating the digital content files with the wrapper and the license; and
   f. hosting the digital content files with the wrapper and the license on a download server.

7. The method as recited in claim 1 wherein the step of the wrapper allowing a purchase of a license when the existing license expires, if any further comprises the steps of:
   a. wrapper contacting the mobile service provider for updating the license;
   b. wrapper getting the next set of license options from the mobile service provider based on the rights workflow associated with the digital content;

c. wrapper prompting the mobile user for payment based on the user's choice of license update;
d. wrapper updating the license according to the user's choice; and
e. wrapper informing the mobile service provider of the user's action.

8. The method as recited in claim 1 wherein no license is downloaded on the mobile device along with the wrapper and the digital content, forcing the mobile user to use the digital content only after purchasing the license separately.

9. The method as recited in claim 1 wherein the license is delivered to the user after charging the user based upon the charging policies of the service.

10. The method as recited in claim 1 wherein the wrapper implements DRM policies on the digital content based on constraint parameters wherein the constraint parameters comprise a count of the number of times the digital content can be used, and a shelf life of the digital content.

11. The method as recited in claim 10 wherein the wrapper presents the license options to the user for license renewal if the constraint parameters are violated.

12. The method as recited in claim 1 wherein the digital content comprises J2ME applications.

13. The method as recited in claim 1 further comprises the step of using the rights workflow wherein the set of license options that are presented to the user for purchase are based to the current license that the user has purchased, if any.

14. A system suitable for enabling the distribution and usage of digital content protected by Digital Rights Management (DRM) policies, the DRM policies being implemented by a wrapper which is added to the digital content, the DRM policies further being implemented without the need of a DRM agent on the mobile device, the system comprising:
   a. at least one mobile service provider for implementation of Digital Rights Management (DRM) policies and distribution of the digital content, the mobile service provider further comprising:
      i. a server for generating a license for the digital content to be downloaded, the license being generated on the basis of Digital Rights Management policies associated with the digital content to be downloaded;
      ii. means for packaging the digital content with the license;
      iii. means for delivering the digital content to the mobile device; and
      iv. means for updating the license on its expiry, the updating being done after fulfillment of preconditions as defined by the DRM policies; and
   b. at least one Java enabled mobile device for using the digital content provided through the mobile service provider.

15. The system as recited in claim 14 further comprising a content provider to provide the digital content.

16. The system as recited in claim 14 wherein the mobile service provider further comprises:
   a. means for informing a user of the digital content hosted;
   b. means for prompting the user for fulfilling preconditions for the digital content to be downloaded, the preconditions being defined in accordance with the license; and
   c. means for charging the user for the digital content to be downloaded.

17. A system suitable for enabling the distribution and usage of digital content protected by Digital Rights Management (DRM) policies, the system being implemented on or in association with a mobile service provider, the mobile service provider having access to the digital content, the digital content being used by any Java-enabled mobile device, the DRM policies being implemented by a wrapper which is added to the digital content, the DRM policies further being implemented without the need of a DRM agent on the mobile device, the system comprising:
   a. a server for generating a license for the digital content to be downloaded, the license being generated on the basis of Digital Rights Management policies and a rights workflow associated with the digital content;
   b. means for packaging the digital content with the license to generate a rights protected digital content;
   c. means for updating the license on its expiry after the preconditions are fulfilled, the preconditions being defined in accordance with the license; and
   d. means for delivering the digital content to the mobile device.

18. The system as recited in claim 17 wherein the mobile service provider further includes:
   a. means for informing a user of the digital content hosted;
   b. means for prompting the user for fulfilling preconditions for the digital content to be downloaded, the preconditions being defined in accordance with the license; and
   c. means for charging the user for the digital content to be downloaded.

19. A computer program product for enabling distribution and usage of digital content associated with Digital Rights Management (DRM) policies, a mobile service provider implementing the DRM policies on the digital content, the digital content being used by mobile users through their respective mobile devices, the mobile devices being Java enabled, the DRM policies being implemented by a wrapper which is added to the digital content, the DRM policies further being implemented without the need of a DRM agent on the mobile device, the computer program product comprising:
   a. a computer readable program means for associating Digital Rights Management policies with the digital content wherein the wrapper is added to the digital content for facilitating implementation of DRM policies on the mobile device;
   b. a computer readable program means for downloading the digital content along with the wrapper onto the mobile device;
   c. a computer readable program means for facilitating download of a license onto the mobile device, the license being generated on the basis of Digital Rights Management policies associated with the downloaded digital content;
   d. a computer readable program means for enabling fulfillment of preconditions for the digital content to be used, the preconditions being defined in accordance with the license;
   e. a computer readable program means for implementing the DRM policies on the mobile device wherein the wrapper allows the mobile user to use the digital content in accordance with the license; and
   f. a computer readable program means for allowing purchase of a license when the existing license expires without the need to download the digital content again.

20. The computer program product as recited in claim 19 further including a computer readable program means for downloading the generated license onto the mobile device along with the wrapper and the digital content, allowing the mobile user to use the digital content in accordance with the license.

21. The computer program product as recited in claim 19 further including a computer readable program means for registering the digital contents with the mobile service provider.

22. The computer program product as recited in claim 19 further including a computer readable program means for delivering the digital content separately to the mobile user wherein no license is downloaded on the mobile device along with the wrapper and the digital content, forcing the mobile user to use the digital content only after purchasing the license separately.

23. A system for implementing DRM policies by adding a wrapper to digital content, the DRM policies being implemented without the need of a DRM agent on the mobile device, the system comprising:
   a. at least one content provider for providing the digital content;
   b. at least one mobile service provider for implementing DRM policies and distributing the digital content, the mobile service provider further comprising:
      i. a packager for generating the wrapper around the digital content wherein the wrapper facilitates implementation of DRM policies on the Java enabled mobile device;
      ii. a licensing server for generating a license for the digital content to be downloaded, the license being generated on the basis of DRM policies associated with the digital content to be downloaded; and
      iii. a content server for delivering the digital content to the Java enabled mobile device; and
   c. at least one Java enabled mobile device for using the digital content provided through the mobile service provider.

* * * * *